May 23, 1939.    R. E. HARWOOD ET AL    2,159,326
CLUTCH AND BRAKE
Filed May 4, 1938    2 Sheets-Sheet 1

INVENTORS
R. E. Harwood and G. E. Munschauer
BY
Popp and Popp
ATTORNEYS

May 23, 1939. R. E. HARWOOD ET AL 2,159,326
CLUTCH AND BRAKE
Filed May 4, 1938 2 Sheets-Sheet 2
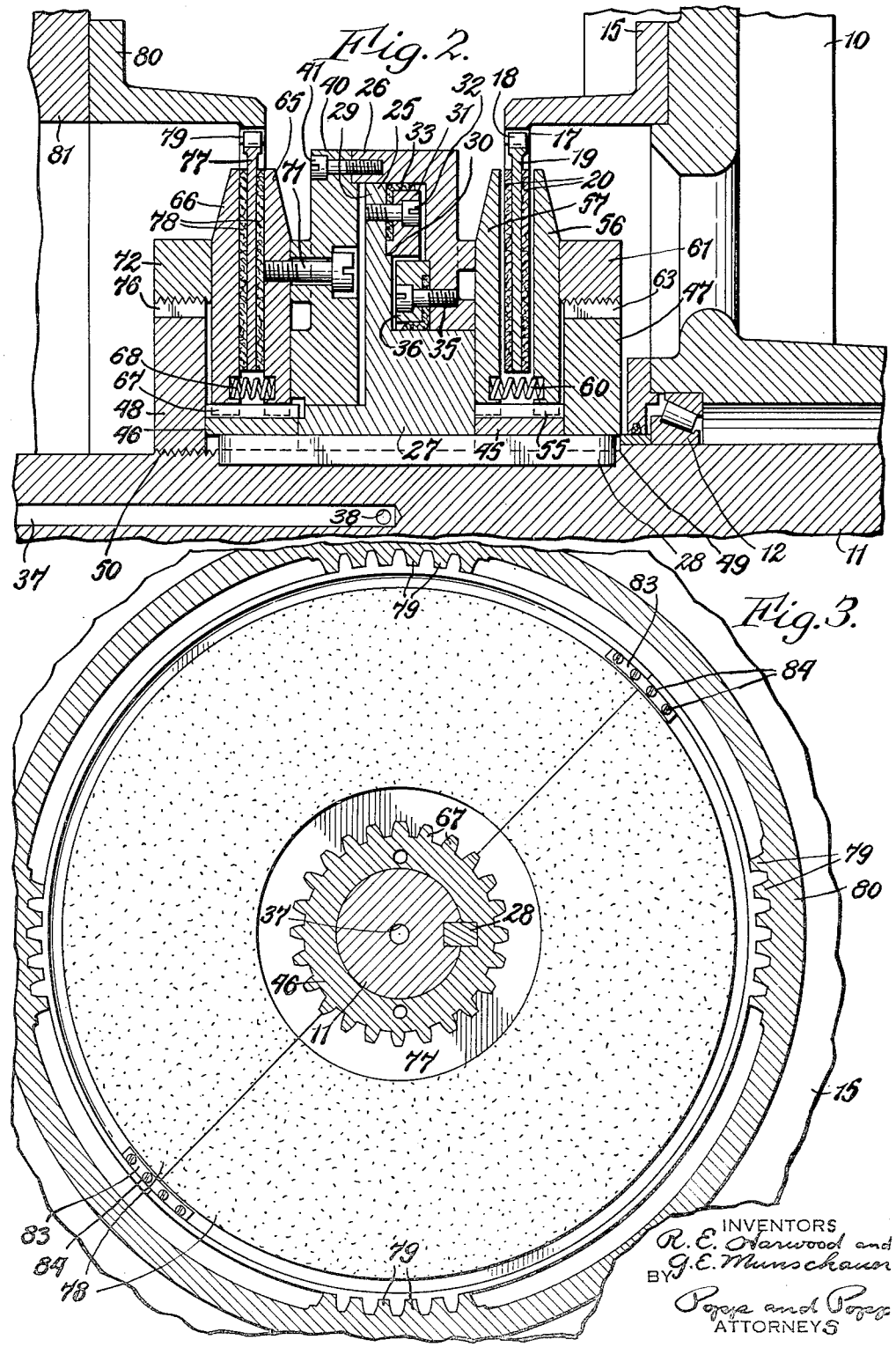

Patented May 23, 1939

2,159,326

UNITED STATES PATENT OFFICE 2,159,326

CLUTCH AND BRAKE

Reymour E. Harwood, Kenmore, and George E. Munschauer, Buffalo, N. Y., assignors to Niagara Machine & Tool Works, Buffalo, N. Y., a corporation of New York Application May 4, 1938, Serial No. 206,010

8 Claims. (Cl. 192—18)

This invention relates to a combined clutch and brake and more particularly to such a combined clutch and brake operated by air pressure and adapted for use in conjunction with presses, although the invention can be employed for other uses and can be operated by fluids other than air.

One of the objects of the invention is to provide such a combined clutch and brake in which a simple adjustment is provided to compensate for the wear on the clutch facings, the adjustment insuring uniform wear upon the facings and the adjustment in no way affecting the springs which are employed to actuate the parts upon release of the air pressure.

Another object of the invention is to provide such a combined clutch and brake in which the clutch disks carrying the linings can be readily removed for relining with the minimum removal of other parts of the mechanism.

Another object of the invention is to provide an improved air piston and cylinder which is of simple and durable construction and operates promptly and efficiently in closing the clutch and releasing the brake and vice versa.

Another aim of the invention is to provide a simple and effective means to facilitate dismantling of the clutch.

In the accompanying drawings:

Fig. 2 is a fragmentary section, taken on line 2—2, Fig. 1.

Fig. 3 is a vertical section, taken on line 3—3, Fig. 1.

Figure 1:
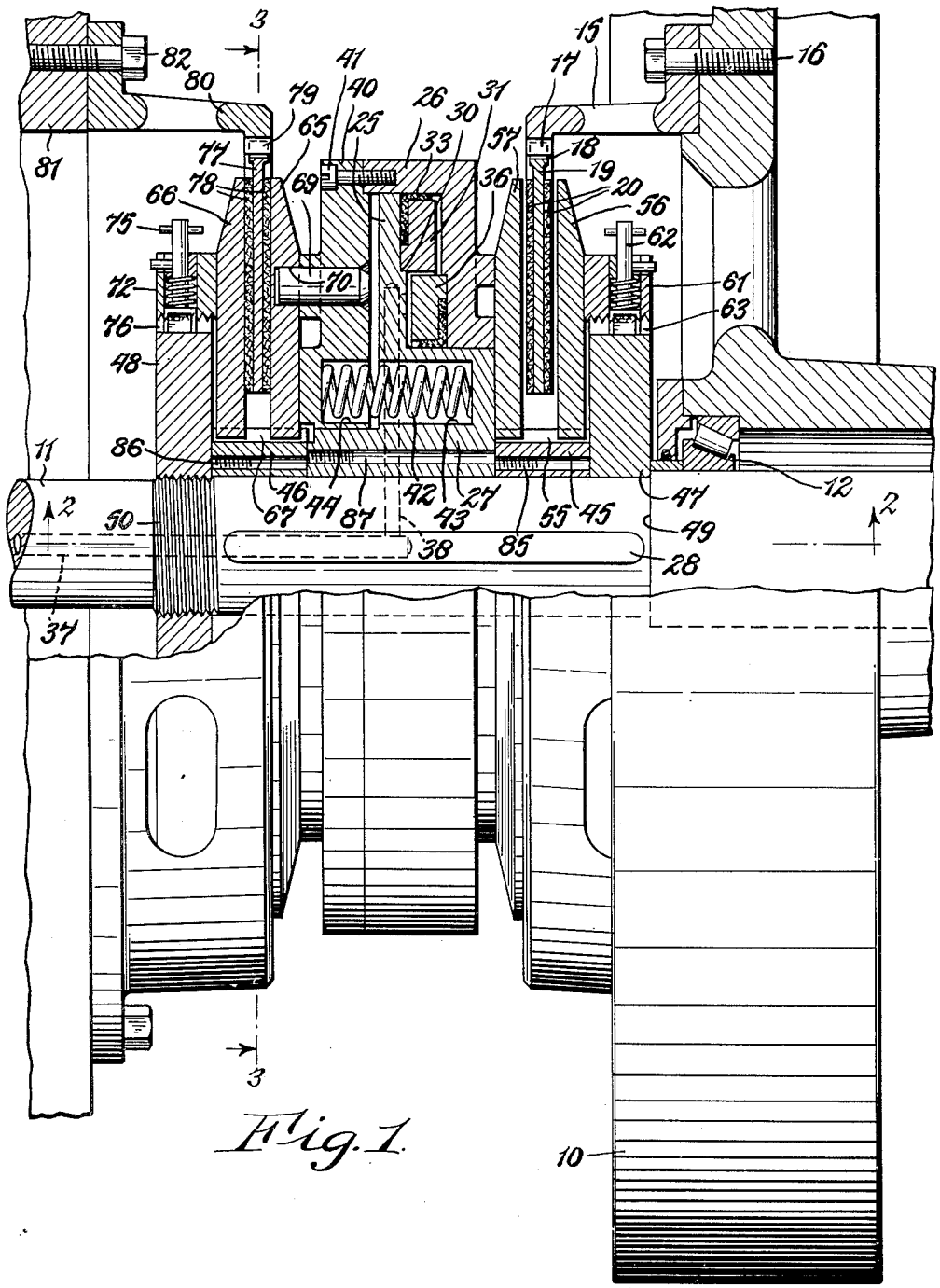
Fig. 1 is a side elevation, partly in section, of a clutch embodying our invention.

The combined clutch and brake illustrated is of the friction disk type and is shown as interposed between a driving member, such as the flywheel 10 of a punch press and a driven member, such as the main drive shaft 11 of this press. The flywheel 10 is shown as loosely mounted on the drive shaft 11, bearings, one of which is illustrated at 12, being provided for this purpose. The flywheel 10 rotates continuously on the drive shaft 11.

A clutch driving ring 15 is secured to the flywheel by means of screws 16 or in any other suitable manner and extends inwardly therefrom. This ring is provided with internal teeth 17 which are adapted to engage similar teeth 18 provided at the periphery of a split driving disk 19. This driving disk is provided with the usual linings 20.

The clutch is operated by means of a piston 25 contained within an operating cylinder 26. The hub 27 of the piston is keyed to the drive shaft 11 by means of a key 28 and its outer part 29 is of disk form and stepped, as indicated at 30, to receive an outer follower ring 31. This outer follower ring is secured to the piston by means of screws 32 or in any other suitable manner, and an outer cup packing 33 is held between this follower ring and the piston to provide a seal between the piston and the cylinder 26. The cylinder 26 is slidingly mounted on the hub 27 of the piston 25 and secured to the cylinder, by means of screws 35 or in any other suitable manner, is an inner follower ring 36, an inner cup packing being clamped between this inner follower ring and the cylinder so as to maintain an airtight seal between the cylinder and the hub 27 of the piston. Air for operating the cylinder is introduced into the working chamber formed between the piston and cylinder through an axial passage 37 provided in the main drive shaft 11 and connecting with a radial passage 38 extending outwardly through the drive shaft and hub 27 of the piston 25 into the working chamber between the piston 25 and the cylinder 26. The piston and cylinder are enclosed by a cylinder cover 40 which is secured by screws 41 to the cylinder wall and interposed between the cylinder cover 40 and the piston 25 are an annular series of compression springs 42, these springs being contained within an annular series of pockets 43 provided in the hub 27 of the piston and a registering series of similar pockets 44 provided in the piston cover 40.

The piston 25 is held against movement between a clutch hub 45 and a brake hub 46, these being in turn held against endwise movement by a clutch end plate 47 and a brake end plate 48. The hubs 45 and 46 and end plate 47 are keyed to the drive shaft 11 by the key 28 and the clutch end plate 47 is held against a shoulder 49 on the drive shaft 11 and the brake end plate 48 screwed on a threaded portion 50 of the drive shaft 11. It will therefore be seen that the piston 25, hubs 45 and 46 and end plates 47 and 48 are secured fast to the drive shaft 11 and rotate therewith.

The periphery of the clutch hub 45 is grooved to provide a series of teeth or splines 55 and on this hub is mounted an outer driven clutch disk 56 and an inner driven clutch disk 57, these clutch disks 56 and 57 being provided with internal jaws or teeth which engage the jaws or teeth 55 of the hub 45 so that the clutch disks are compelled to rotate with the hub but are free to slide thereon. These clutch disks are yieldingly held apart by an annular series of compression springs 60, the clutch disk 57 being held in engagement with the cylinder 26 and the clutch disk 56 being held in engagement with an adjusting ring 61. The adjusting ring is internally threaded and is screwed on the exterior of the clutch end plate 47. The adjusted position of the adjusting ring 61 is maintained by a spring loaded locking pin 62 mounted on the adjusting ring and engageable with one of a series of slots 63 provided in the clutch end plate 47.

In a similar manner an outer brake disk 65 and an inner brake disk 66 are mounted on the brake hub 46, this brake hub being provided with teeth or jaws 67 interfitting with internal teeth or jaws provided in the brake disks 65 and 66 so that these brake disks are compelled to rotate with the hub 46 and the drive shaft 11, but are free to slide lengthwise thereof. The brake disks 65 and 66 are yieldingly held apart by an annular series of compression springs 68. In order to prevent the cylinder 26 from rotating relative to piston 25, a plurality of pins 69 are provided, these pins being welded to the cylinder cover 40 and being closely fitted in corresponding openings 70 provided in the outer brake disk 65. This outer brake disk 65 is compelled to move in unison with the piston 25, by means of jaws meshing with similar jaws of brake hub 46 which is keyed to the shaft 11 as is the piston 25. The inner brake disk 66 is urged into engagement with an internally threaded adjusting ring 72, this ring being screwed on the exterior of the brake end plate 48. As with the adjusting ring 61 the adjusted position of the adjusting ring 72 is maintained by a spring loaded locking pin 75 which is engageable in one of a series of grooves 76 provided in the brake end plate 48. Interposed between the inner and outer brake disks 65 and 66 is a split disk 77 provided with facings 78. The rim of the split disk 77 is formed to provide teeth engageable with internal teeth 79 provided in a brake ring 80. The brake ring is secured to a stationary part 81 of the punch press frame in any suitable manner as by screws 82.

It will be understood that while only one split disk 19 is illustrated in the clutch and only one split disk 77 is illustrated in the brake, these disks can be provided in any suitable number. The sections of these split disks 19 and 77 are also preferably secured together by small clips or bars of metal 83 which are arranged at the rims of the split disk and extend over the two sections. These clips 83 can be secured to the two disk sections by screws or bolts 84 or in any other suitable manner.

In order to facilitate removal and replacement of the split disks 19 and 77 when it is necessary to reline these disks, the internal diameter of the clutch driving ring 15 and also the brake ring 80 is larger than the external diameter of the operating cylinder 26. By this means it will be seen that in order to remove the split clutch disk 19 it is merely necessary to remove the screws 16 and slip the clutch driving ring 15 over the operating cylinder 26 after which the screws 84 are accessible and the clips 83 connecting the sections of the split disk 19 can be removed. The two halves composing the driving disk 19 can thereby be removed and relined after which the parts can be reassembled in their original position. In the same manner the split disk 77 of the brake can be readily removed by the simple expedient of removing the screws 82 and slipping the brake ring 80 over the operating cylinder 26.

In disassembling the clutch difficulty was encountered in removing the hubs 45 and 46 as well as the piston 25 from the drive shaft 11. To facilitate the removal of these parts a pair of oppositely located threaded holes 85 are provided in the hub 45; a similar pair of threaded holes 86 are provided in the hub 46 and a pair of threaded holes 87 are provided in the hub 27 of the piston 25. These threaded holes all extend through the hubs parallel with their axes but the pair of holes 87 must be out of line with the holes 85 and 86. In order to remove the hub 46 from the shaft 11 the operator inserts screws (not shown) in the holes 86 and screws them down until they engage the end face of the hub 27 of the piston 25. Upon then tightening these screws further the hub 46 is moved axially and easily removed. In a similar manner, screws (not shown) are inserted in the threaded holes 87 for removing the piston and in the holes 85 for removing the hub 45.

In the operation of the combined clutch and brake as described, the annular series of compression springs 42 normally hold the parts in the position illustrated in Fig. 1 in which the clutch is released and the brake is applied. Thus it will be seen that the compression springs 42 urge the operating cylinder 26 and its cover 40 to the left as viewed in Fig. 1, thereby permitting the compression springs 60 to spread the clutch disks 56 and 57 and free them from engagement with the facings of the split disk 19. The urging of the operating cylinder 26 to the left by the compression springs 42 also moves the brake disks 65 and 66 together thereby to clamp the split brake disk 77 therebetween.

When the operator wishes to release the brake and close the clutch to establish a driving connection between the flywheel 10 and the drive shaft 11 he admits air under pressure into the axial passage 27 in the drive shaft 11 by any suitable means (not shown), this air under pressure being conducted through the radial passage 38 in the drive shaft 11 and piston 25 into the working chamber between the piston 25 and the operating cylinder 26.

Since the piston 25 is held against movement relative to the shaft 11 the introduction of air under pressure into the working chamber of the operating cylinder 26 moves the operating cylinder 26 toward the flywheel, this compressing the annular series of compression springs 42. This movement of the operating cylinder positively moves the outer brake disk 65 away from the split disk 77, thereby releasing the facings of the split disk 77 from engagement with the brake disks 65 and 66 and hence releasing the brake. This movement of the operating cylinder 26 to the right also moves the clutch disk 57 toward the clutch disk 56, thereby to clamp the split disk 19 between them, the return springs 60 being compressed. This establishes a driving connection from the flywheel 10 and through the clutch driving ring 15, split disk 19, clutch disks 56 and 57 and hub 45 to the driving shaft 11 on which this hub is keyed.

In order to adjust the clutch as the facings 20 become worn, the operator pulls out the pin 62 and turns the adjusting ring 61 to advance it toward the operating cylinder 26. This moves the clutch disk 56 toward the companion disk 57 and hence restores the desired clearance between these disks and the facings of the split ring when the clutch is open. In a similar manner the spacing of the brake disks 65 and 66 can be adjusted by withdrawing the pin 75 and turning the adjusting ring 72 accordingly. It will be noted that this adjustment, to compensate for wear, and to thereby hold the movement of the operating cylinder and amount of air used to a minimum, in no way disturbs the operation of the compression springs 42 so that these springs cannot be overloaded. By making the springs 42 of fixed length the clutch is rendered foolproof in that it cannot be adjusted to overload these springs 42 by an operator feeling that more brake pressure is needed when some other part of the brake or clutch needs adjustment. It will furthermore be seen that by adjusting the brake disks through the medium of adjusting rings with locking pins, the adjustment is uniform on all sides of the disks. This is an important distinction as compared with prior types of adjusting devices in which several screws or the like were provided and all of which had to be uniformly advanced as the brake linings wore with the result that it would frequently happen that one of the screws would be adjusted more than the other and hence greater wear occur on one side of the facing.

From the foregoing it will be seen that the present invention provides a very simple, reliable and relatively inexpensive form of pneumatically operated combined clutch and brake in which the springs for applying the brake are selected to provide the correct brake pressure and require no adjustment, the adjustment of the clutch and brake as the facings wear in no way altering the effect of these springs. By the adjusting rings shown the clutch and brake can be readily taken up without danger of exerting more pressure on one side of the friction disks than on the other. Furthermore, by making the piston smaller in diameter than the internal diameter of the driving ring and brake ring it is possible to readily remove the split rings for effecting a removal of their linings by the simple expedient of slipping the driving ring and brake ring over the operating cylinder. It will also be seen that by the use of the follower rings and cup packings within the cylinder in the manner shown a very simple and effective pneumatic cylinder and piston construction is provided. The clutch is also easy to adjust and dismantle and can be readily kept in good working condition.

By the term "clutch mechanism" as used in the accompanying claims is meant a mechanism for connecting two relatively rotatable parts and hence includes both the clutch and brake structures shown and described.

We claim as our invention:

1. A combined clutch and brake, comprising a drive shaft, a wheel loosely mounted on said drive shaft, a hub fixed to said shaft and formed to provide a piston, an axially movable operating cylinder housing said piston, said hub and the interior of said cylinder being formed to provide an annular series of opposed pockets, a compression spring of predetermined strength compressed within each pair of said opposed pockets, means for introducing fluid under pressure to the working chamber of said cylinder to move said cylinder in opposition to said springs, a pair of clutch disks mounted on and rotating with said shaft and located between said cylinder and said wheel, a friction disk mounted on said wheel and interposed between said pair of clutch disks, a pair of brake disks mounted on and rotating with said shaft and arranged on the opposite side of said cylinder from said wheel, a friction disk secured to a stationary part of said press and interposed between said pair of brake disks, spring means between said pairs of disks and urging them apart, means for moving one of said pair of clutch disks axially to an operative position in response to the movement of said cylinder in one direction, means for moving one of said pair of brake disks axially to an operative position in response to the movement of the cylinder in the opposite direction, means for adjusting the other of said pair of clutch disks axially toward said piston and means for adjusting the other of said pair of brake disks axially toward said piston.

2. A clutch mechanism for connecting a shaft with a relatively rotatable member, comprising a pair of disks mounted on and rotating with said shaft, a friction disk mounted on said relatively rotatable member and interposed between said pair of disks, a hub fixed to said shaft and formed to provide a piston, an axially movable operating cylinder housing said piston, said hub and the interior of said cylinder being formed to provide an annular series of opposed pockets, a compression spring of predetermined strength compressed within each of said opposed pockets, means for introducing fluid under pressure to the working chamber in said cylinder to move said cylinder in opposition to said springs, means for moving one of said pair of disks in response to the movement of said cylinder, spring means interposed between said pair of disks and urging them apart and means for adjusting the other of said pair of disks axially toward said piston comprising an externally threaded plate fixed to said shaft and arranged on the side of said pair of disks remote from said piston and an internally threaded adjusting ring mounted on said plate concentric with said shaft and adapted on being turned to engage said other of said pair of disks to form an adjustable abutment therefor.

3. A clutch mechanism for connecting a shaft with a relatively rotatable member, comprising a pair of disks mounted on and rotating with said shaft, a friction disk mounted on said relatively rotatable member and interposed between said pair of disks, a hub fixed to said shaft and formed to provide a piston, an axially movable operating cylinder housing said piston, an outer follower ring secured to said piston within the working chamber of said cylinder, an outer cup packing clamped to said piston by said follower ring and engaging the cylinder wall, an inner follower ring secured to said cylinder within the working chamber of said cylinder, an inner cup packing clamped to said cylinder by said inner follower ring and engaging the hub of said piston, spring means for urging said cylinder in one direction, means for introducing fluid under pressure to the working chamber in said cylinder to move said cylinder in opposition to said spring means, means for moving one of said pair of disks in response to the movement of said cylinder, spring means interposed between said pair of disks and urging them apart and means for adjusting the other of said pair of disks axially toward said piston.

4. A clutch mechanism for connecting a shaft with a relatively rotatable member, comprising a pair of disks mounted on and rotating with said shaft, a friction disk mounted on said relatively rotatable member and interposed between said pair of disks, a hub fixed to said shaft and formed to provide a piston, an axially movable operating cylinder housing said piston, said hub and the interior of said cylinder being formed to provide an annular series of opposed pockets, a compression spring of predetermined strength compressed within each pair of said opposed pockets, an outer follower ring secured to said piston within the working chamber of said cylinder, an outer cup packing clamped to said piston by said follower ring and engaging the cylinder wall, an inner follower ring secured to said cylinder within the working chamber of said piston, an inner cup packing clamped to said cylinder by said inner follower ring and engaging the hub of said piston, means for introducing fluid under pressure to the working chamber in said cylinder to move said cylinder in opposition to said springs, means for moving one of said pair of disks in response to the movement of said cylinder, spring means interposed between said pair of disks and urging them apart and means for adjusting the other of said pair of disks axially toward said piston.

5. A clutch mechanism for connecting a shaft with a relatively rotatable member, comprising a ring removably mounted on said relatively rotatable member concentric with said shaft and provided in its internal diameter with a plurality of axially extending teeth, a split friction disk having external teeth engaging the internal teeth of said ring, a pair of disks mounted on and rotating with said shaft and arranged on opposite sides of said friction disk, a hub fixed to said shaft on the side of said pair of disks opposite from said relatively rotatable member and formed to provide a piston, an axially movable operating cylinder housing said piston, spring means for urging said cylinder axially in one direction, means for introducing fluid under pressure to the working chamber in said cylinder to move said cylinder in opposition to said spring means, means for moving one of said pair of disks in response to the movement of said cylinder, spring means interposed between said pair of disks and urging them apart and means for adjusting the other of said pair of disks axially toward said piston, said cylinder having an external diameter smaller than the internal diameter of said ring whereby upon removing said ring it is capable of being slipped over said piston to permit access to said split friction disk.

6. A combined clutch and brake, comprising a drive shaft, a wheel loosely mounted on said drive shaft, a hub fixed to said shaft and formed to provide a piston, an axially movable operating cylinder housing said piston, spring means for moving said cylinder in one direction, means for introducing fluid under pressure to the working chamber of said cylinder to move said cylinder in opposition to said spring means, a pair of clutch disks mounted on and rotating with said shaft and located between said cylinder and said wheel, a split friction clutch disk interposed between said pair of clutch disks and having external teeth, a clutch driving ring removably secured to said wheel and having teeth in its internal diameter engaging the external teeth of said split friction clutch disk, a pair of brake disks mounted on and rotating with said shaft and arranged on the opposite side of said cylinder from said wheel, a split friction brake disk interposed between said pair of brake disks and having external teeth, a brake ring removably mounted on a stationary part and having teeth in its internal diameter engageable with the external teeth of said split brake disk, spring means between said pairs of disks and urging them apart, means for moving one of said pair of clutch disks axially to an operative position in response to the movement of the cylinder in one direction, means for moving one of said pair of brake disks axially to an operative position in response to the movement of the cylinder in the opposite direction, means for adjusting the other of said pair of clutch disks axially toward said piston and means for adjusting the other of said brake disks axially toward said piston, the external diameter of said piston being smaller than the internal diameter of said clutch driving ring and also smaller than the internal diameter of said brake ring whereby upon removing either of said rings, said rings can be slipped over said cylinder to permit access to the corresponding split disk.

7. A combined clutch and brake, comprising a drive shaft, a wheel loosely mounted on said drive shaft, a hub fixed to said shaft and formed to provide a piston, an axially movable operating cylinder housing said piston, said hub and the interior of said cylinder being formed to provide an annular series of opposed pockets, a compression spring of predetermined strength compressed within each pair of said opposed pockets, means for introducing fluid under pressure to the working chamber of said cylinder to move said cylinder in opposition to said springs, a pair of clutch disks mounted on and rotating with said shaft and located between said cylinder and said wheel, a split friction clutch disk interposed between said pair of clutch disks and having external teeth, a clutch driving ring removably secured to said wheel and having teeth in its internal diameter engaging the external teeth of said split friction clutch disk, a pair of brake disks mounted on and rotating with said shaft and arranged on the opposite side of said cylinder from said wheel, a split friction brake disk interposed between said pair of brake disks and having external teeth, a brake ring removably mounted on a stationary part and having teeth in its internal diameter engageable with the external teeth of said split brake disk, spring means between said pairs of disks and urging them apart, means for moving one of said pair of clutch disks axially to an operative position in response to the movement of the cylinder in one direction, means for moving one of said pair of brake disks axially to an operative position in response to the movement of the cylinder in the opposite direction, means for adusting the other of said pair of clutch disks axially toward said piston comprising a circular clutch end plate mounted on said shaft between said wheel and said pair of clutch disks and externally threaded, and an internally threaded adjusting ring mounted on said plate and rotatable to move it into engagement with said other of said pair of clutch disks and means for adjusting the other of said pair of brake disks axially toward said piston comprising a brake end plate mounted on said shaft within said brake ring and externally threaded and an internally threaded brake adjusting ring mounted on said brake end plate and rotatable to move it into engagement with the other of said pair of brake disks, the external diameter of said piston being smaller than the internal diameter of said clutch driving ring and said brake ring whereby upon removing said clutch driving ring or said brake ring, the ring can be slipped over said piston to render the corresponding split friction disk accessible for removal.

8. A clutch mechanism connecting a shaft with a relatively rotatable member, comprising a hub on said shaft and formed to provide a piston, a second hub on said shaft, means for keying said hubs to said shaft, removable means for clamping said hubs against endwise movement relative to said shaft, a cylinder housing said piston, means for admitting air under pressure to the working chamber between said piston and cylinder, clutch means carried by said second hub and adapted to establish a driving connection between said flywheel and shaft, means for operating said clutch means through motion derived through the movement of said cylinder and means facilitating removal of said hubs from said shaft comprising a threaded hole extending through each hub parallel with the axes thereof, said holes being out of line whereby upon inserting screws and tightening the same said hubs are forced axially along said shaft.

REYMOUR E. HARWOOD.
GEORGE E. MUNSCHAUER.